H. HAUSCHILDT.
BALE-HOOK.
No. 187,272. Patented Feb. 13, 1877.
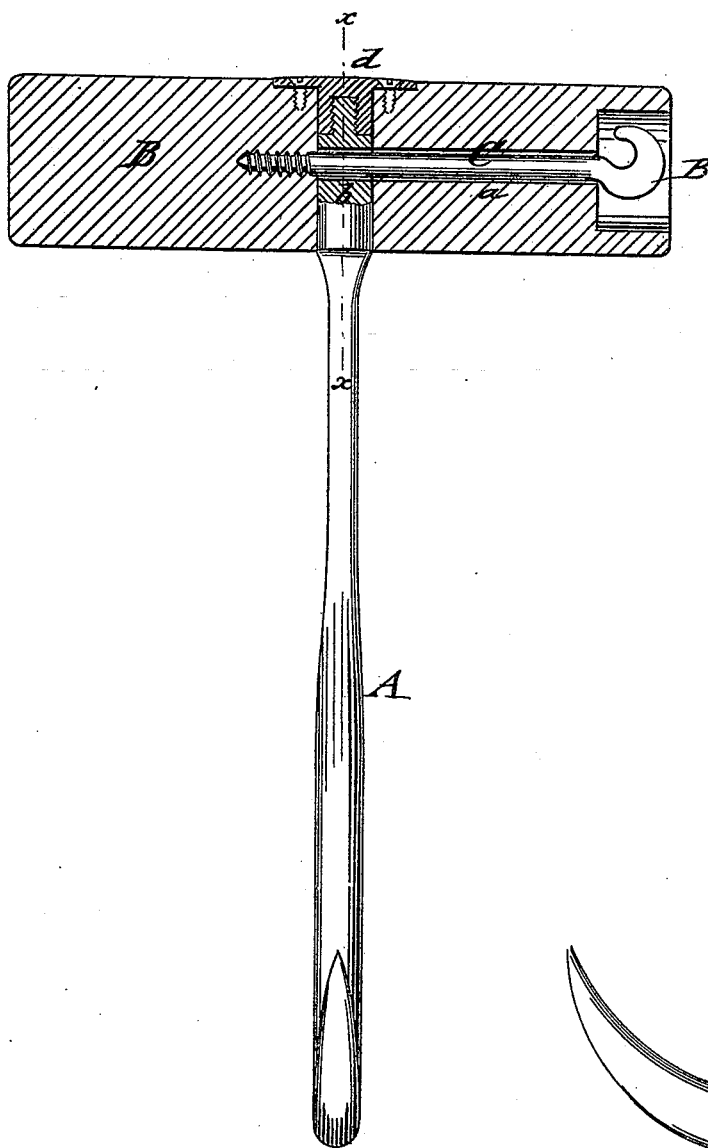
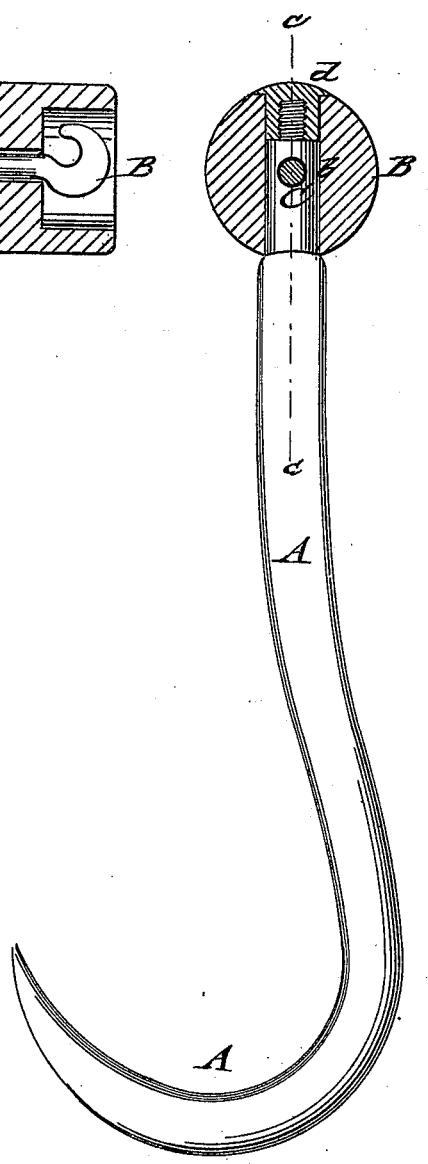

UNITED STATES PATENT OFFICE.

HENRY HAUSCHILDT, OF NEW YORK, N. Y.

IMPROVEMENT IN BALE-HOOKS.

Specification forming part of Letters Patent No. 187,272, dated February 13, 1877; application filed January 13, 1877.

*To all whom it may concern:*

Be it known that I, HENRY HAUSCHILDT, of the city, county, and State of New York, have invented a new and Improved Bale-Hook, of which the following is a specification:

The object of my invention is to provide, for the handling of cotton, wool, hay, and other bales, an improved hook that is rigidly connected to the handle without working loose therein or injuring the hand of the workman using it.

The invention will first be described in connection with the drawing, and then pointed out in the claim.

In the accompanying drawing, Figure 1 represents an end view of the bale-hook, with handle, in longitudinal section in line $c\ c$, Fig. 2, and Fig. 2 is a side view of the hook with handle in transverse section on line $x\ x$, Fig. 1.

Similar letters of reference indicate corresponding parts.

A in the drawing represents a bale hook of cast steel, or other material, and B the wooden handle of the same, which is secured by a socket-hole to the shank end of the hook, and rigidly secured by a cross pin or key, C, that is passed through a longitudinal hole, $a$, of the handle, and an eye, $b$, of the shank end of the hook, as shown in Figs. 1 and 2.

For common hooks, the driving in of the key into the part of the handle back of the shank forms a sufficiently strong connection, but for a better and stronger quality of hooks the shank end may be threaded and screwed into a screw-socket, $d$, of the handle, the key being also threaded at the end and screwed into the wood of the handle at the side opposite to the longitudinal entrance-hole of the key.

Thus a very strong and superior connection of the shank end of hook with handle and key is obtained, that will resist any strain without loosening the handle or splitting the same, or injuring the hand by the rivet end of the shank.

For being shipped, the handle may be readily detached from the hook by withdrawing the key, which allows a more compact packing of the hooks.

Having thus described my invention, I claim as new, and desire to secure by Letters Patent—

The combination of hook A, having screw at the upper end and cross slot below the screw, the headed nut $d$, the long bolt C, having end-screw, and the handle B, perforated longitudinally as well as transversely, all as shown and described.

HENRY HAUSCHILDT.

Witnesses:
 PAUL GOEPEL,
 C. SEDGWICK.